United States Patent
Shahriari et al.

(10) Patent No.: US 11,919,582 B2
(45) Date of Patent: Mar. 5, 2024

(54) METHODS, SYSTEMS, AND APPARATUSES FOR REAL-TIME ADAPTATION OF HANDWHEEL ANGLE CONTROLS FOR ROBUST AUTOMATED DRIVING TO ENVIRONMENTAL CONDITIONS AND MODEL UNCERTAINTIES

(71) Applicant: GM GLOBAL TECHNOLOGY OPERATIONS LLC, Detroit, MI (US)

(72) Inventors: Mohammadali Shahriari, Markham (CA); Mohammed Raju Hossain, Scarborough (CA); Ashraf Abualfellat, Grand Blanc, MI (US); Brian Porto, Wixom, MI (US)

(73) Assignee: GM GLOBAL TECHNOLOGY OPERATION LLC, Detroit, MI (US)

(*) Notice: Subject to any disclaimer, the term of this patent is extended or adjusted under 35 U.S.C. 154(b) by 261 days.

(21) Appl. No.: 17/652,962

(22) Filed: Mar. 1, 2022

(65) Prior Publication Data
US 2023/0278622 A1 Sep. 7, 2023

(51) Int. Cl.
*B62D 5/04* (2006.01)
*B60W 30/12* (2020.01)

(52) U.S. Cl.
CPC .......... *B62D 5/0484* (2013.01); *B60W 30/12* (2013.01); *B62D 5/0463* (2013.01)

(58) Field of Classification Search
CPC ...... B62D 5/0484; B62D 5/0463; B62D 6/00; B62D 15/025
See application file for complete search history.

(56) References Cited

U.S. PATENT DOCUMENTS

| | | | | |
|---|---|---|---|---|
| 2003/0079933 | A1* | 5/2003 | Chabaan | B62D 5/0463 180/443 |
| 2004/0060765 | A1* | 4/2004 | Mattson | B60T 8/1755 180/422 |
| 2016/0121923 | A1* | 5/2016 | Maeda | B62D 5/0481 701/41 |
| 2018/0273026 | A1* | 9/2018 | Oyama | B60W 30/18145 |
| 2019/0329818 | A1* | 10/2019 | Shoji | B62D 15/025 |
| 2022/0289269 | A1* | 9/2022 | Zhao | B60W 40/10 |
| 2023/0311868 | A1* | 10/2023 | Varnier | B60W 30/18163 701/41 |

* cited by examiner

Primary Examiner — George C Jin
(74) Attorney, Agent, or Firm — Lorenz & Kipf LLP

(57) ABSTRACT

In various embodiments, methods, systems, and vehicle apparatuses are provided. A method for lateral control of a steering system includes identifying at least one parameter of at least one lateral control feature that results in an optimized value in an outcome of control for a lateral control feature enabling robustness to an uncertainty; adaptively adjusting an output control signal generated by a vehicle trajectory controller coupled to the steering controller, by quantifying the uncertainty of an uncertain value in a lateral control feature; and sending a control command including at least a torque control or a wheel angle control to compensate for the uncertainty of the at least one uncertain value in the configuration of components of an electronic power steering (EPS) system associated with the vehicle variant by correcting at least one parameter of the at least one lateral control feature.

20 Claims, 5 Drawing Sheets

METHODS, SYSTEMS, AND APPARATUSES FOR REAL-TIME ADAPTATION OF HANDWHEEL ANGLE CONTROLS FOR ROBUST AUTOMATED DRIVING TO ENVIRONMENTAL CONDITIONS AND MODEL UNCERTAINTIES

INTRODUCTION

The technical field generally relates to steering and handwheel angle control methods, systems, and apparatuses and more particularly relates to methods, systems, and apparatuses for adaptive steering and handwheel control that accounts for steering uncertainties and provides at least robust steering controls for lateral control features of an Advanced Driver-Assistance System (ADAS).

Recent years have seen significant advancements in autonomous and semi-autonomous driving features in land driven vehicles, such as Super Cruise (a hands-free semi-autonomous driver assistance feature that uses high-definition maps and sensors watching the road to assist with accelerating, and decelerating a vehicle), LKA (lane-keeping assist, which is a semi-autonomous driving feature that assists with the steering to keep a vehicle within the lane boundaries or centered in a lane), and others. Vehicles may still be improved in a number of respects.

Some challenges in vehicle lateral control are parameter identification for steering systems. For instance, the suboptimal value in an outcome of a control action of an automated driver-assist lateral control feature such as lane centering can result in underdamped lane-centering performance or jittery control. The suboptimal outcome value must be properly managed and adapted especially when proliferating to several variants for a common vehicle assembly program.

When implementing control systems that have been configured based on simulation results for use in actual operating environments, an adaption approach of the control systems is required to achieve similar performance levels in actual operation when compared to the simulated results because of imperfections of actuators and sensors when deployed or assembled in the vehicle. The adaptation of the controls in real-time vehicle operations can compensate for the inherent uncertainties in assembled components of various vehicle implementations to achieve higher performance levels (similar to those achieved by simulation) in driving conditions.

Furthermore, other desirable features and characteristics of the present invention will become apparent from the subsequent detailed description and the appended claims, taken in conjunction with the accompanying drawings and the foregoing technical field and background.

SUMMARY

A method, system, and apparatus for adaptive handwheel angle control for a vehicle steering system are disclosed.

In one exemplary embodiment, a method for lateral control of a steering system is provided. The method includes identifying, by a steering controller disposed of in a vehicle, at least one parameter of at least one lateral control feature of an Advanced Driver Assist System (ADAS) that causes at least a result in an optimized value in an outcome of control for at least one lateral control feature enabling a robustness to an uncertainty of at least one uncertain value used in the outcome of control; adaptively adjusting, by the steering controller, an output control signal generated by a vehicle trajectory controller coupled to the steering controller, by quantifying the uncertainty of at least one uncertain value in the at least one lateral control feature wherein uncertainty of the at least one uncertain value in the at least one lateral control feature is caused from at least one component variant in a configuration of components associated with a vehicle variant; and sending, by the steering controller, a control command including at least a torque control or a wheel angle control to compensate for the uncertainty of the at least one uncertain value in the configuration of components of an electronic power steering (EPS) system associated with the vehicle variant by correcting at least one parameter of the at least one lateral control feature wherein the correcting of the at least one parameter causes a suboptimal value in the outcome of control for the at least one lateral control feature.

In at least one exemplary embodiment, the method further includes applying, by the steering controller, a feed-forward control action to at least enhance robustness in response to the uncertainty in the outcome of the control of at least one lateral control feature applied by the EPS system wherein the uncertainty includes model and environmental uncertainties.

In at least one exemplary embodiment, the method further includes wherein the torque control command includes at least a torque-assist or the wheel angle control to the steering system to compensate for the uncertainty of the at least one uncertain value in the at least one lateral control feature.

In at least one exemplary embodiment, the method further includes adapting, by the steering controller, a correction to the at least one parameter used in at least the wheel angle control of the steering system that is associated with at least a function of a low excitation state in lateral movement of the vehicle that is caused during application of the at least one lateral control feature.

In at least one exemplary embodiment, the method further includes wherein at least one lateral control feature is directed to control features of the steering control implemented with the steering system.

In at least one exemplary embodiment, the method further includes wherein at least one lateral control feature includes a lane-centering lateral control feature of the steering control implemented with the steering system.

In at least one exemplary embodiment, the method further includes distributing at least one calibration associated with at least one component variant for use with at least one or more features that are incorporated in the vehicle variant.

In at least one exemplary embodiment, the method further includes detecting a failure in at least one component variant associated with at least one lateral control feature of the vehicle variant.

In at least one exemplary embodiment, the method further includes learning, by the steering controller, the uncertainty of at least one uncertain parameter or an uncertain state in at least one lateral control feature in a configuration associated with the vehicle variant in an operating environment of the vehicle variant that contains a condition that impacts the steering control wherein the condition causes the at least one uncertain parameter or the uncertain state in the at least one lateral control feature in the vehicle variant wherein the vehicle variant includes a temperature change in the operating environment.

In another exemplary embodiment, a system is provided. The system includes a processing unit disposed of in a vehicle including one or more processors configured by programming instructions encoded on non-transient computer-readable media for control of at least an electronic power steering (EPS) that includes a steering controller configured to: send a control command including at least a torque control or an angle control, to the EPS that is based on input control signals from a vehicle trajectory control system that causes a corrective action by a feed-forward control of a steering system; identify at least one parameter of at least one lateral control feature of an Advanced Driver Assist System (ADAS) that results in an optimized value to an outcome of control for at least one lateral control feature that results in a robust response to an uncertainty of at least one uncertain value used in the control; calibrate an output control signal generated by a vehicle trajectory controller coupled to the steering controller, by quantifying the uncertainty of at least one uncertain value in the at least one lateral control feature wherein uncertainty of the at least one uncertain value in the at least one lateral control feature is caused from at least one component variant in a configuration of components associated with a vehicle variant; and send the control command to compensate for the uncertainty of the at least one uncertain value in the configuration of components associated with the vehicle variant by adjusting at least one parameter of the at least one lateral control feature wherein the adjusting of the at least one parameter causes a suboptimal value of outcome of the control for the at least one lateral control feature.

In at least one exemplary embodiment, the system further includes the processing unit configured to: apply the feed-forward control to the steering system to at least enhance robustness in response to the uncertainty, wherein the uncertainty includes at least a model uncertainty and environmental uncertainty, in the outcome of the control of the at least one lateral control feature applied by the EPS.

In at least one exemplary embodiment, the system further includes wherein the torque control command includes at least a torque-assist, or the angle control, to the steering system to compensate for the uncertainty of the at least one uncertain value in the at least one lateral control feature.

In at least one exemplary embodiment, the system further includes the processing unit configured to: adapt the adjusting to at least one parameter for at least a handwheel angle control, or another input to the model including at least a road wheel angle, of the steering system that is associated with at least a function of a low excitation state in lateral movement of the vehicle caused during use of the at least one lateral control feature.

In at least one exemplary embodiment, the system further includes wherein at least one lateral control feature is directed to steering control implemented with the steering system.

In at least one exemplary embodiment, the system further includes wherein at least one lateral control feature includes a lane-centering lateral control feature of the steering control implemented with the steering system.

In at least one exemplary embodiment, the system further includes: the processing unit configured to distribute at least one calibration associated with at least one component variant for use with at least one or more lateral control features that are incorporated in the vehicle variant.

In at least one exemplary embodiment, the system further includes the processing unit configured to: detect a failure in the least one component variant associated with at least one lateral control feature of the vehicle variant.

In yet another exemplary embodiment, a vehicle apparatus is provided. The vehicle apparatus including an electronic power steering (EPS) unit including one or more processors and non-transient computer-readable media encoded with programming instructions, for control of the EPS unit is configured to: send a torque control that is based on input control signals from a vehicle trajectory control system that causes a corrective action by a feed-forward control of a steering controller of a steering system; identify at least one parameter of at least one lateral control feature that causes at least a result in an optimized value in an outcome of a control for at least one lateral control feature and enables a robust response to an uncertainty of at least one uncertain value in the control; calibrate an output control signal generated by a vehicle trajectory controller coupled to the steering controller, by quantifying the uncertainty of at least one uncertain value in the at least one lateral control feature wherein uncertainty of the at least one uncertain value in the at least one lateral control feature is caused from at least one component variant in a configuration of components associated with a vehicle variant; and send a torque control command to compensate for the uncertainty of the at least one uncertain value in the configuration of components associated with the vehicle variant by adjusting at least one parameter of the at least one lateral control feature wherein the adjusting of the at least one parameter causes a suboptimal value of the outcome of the control for the at least one lateral control feature.

In at least one exemplary embodiment, the vehicle apparatus further includes the steering controller configured to apply a feed-forward control action for adjusting the suboptimal value in the outcome of the control of at least one control feature applied by the EPS unit.

In at least one exemplary embodiment, the vehicle apparatus further includes the steering controller configured to: adapt the adjusting to at least one parameter for a wheel angle control of the steering system that is associated with at least a function of low excitation caused during use of the at least one lateral control feature.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
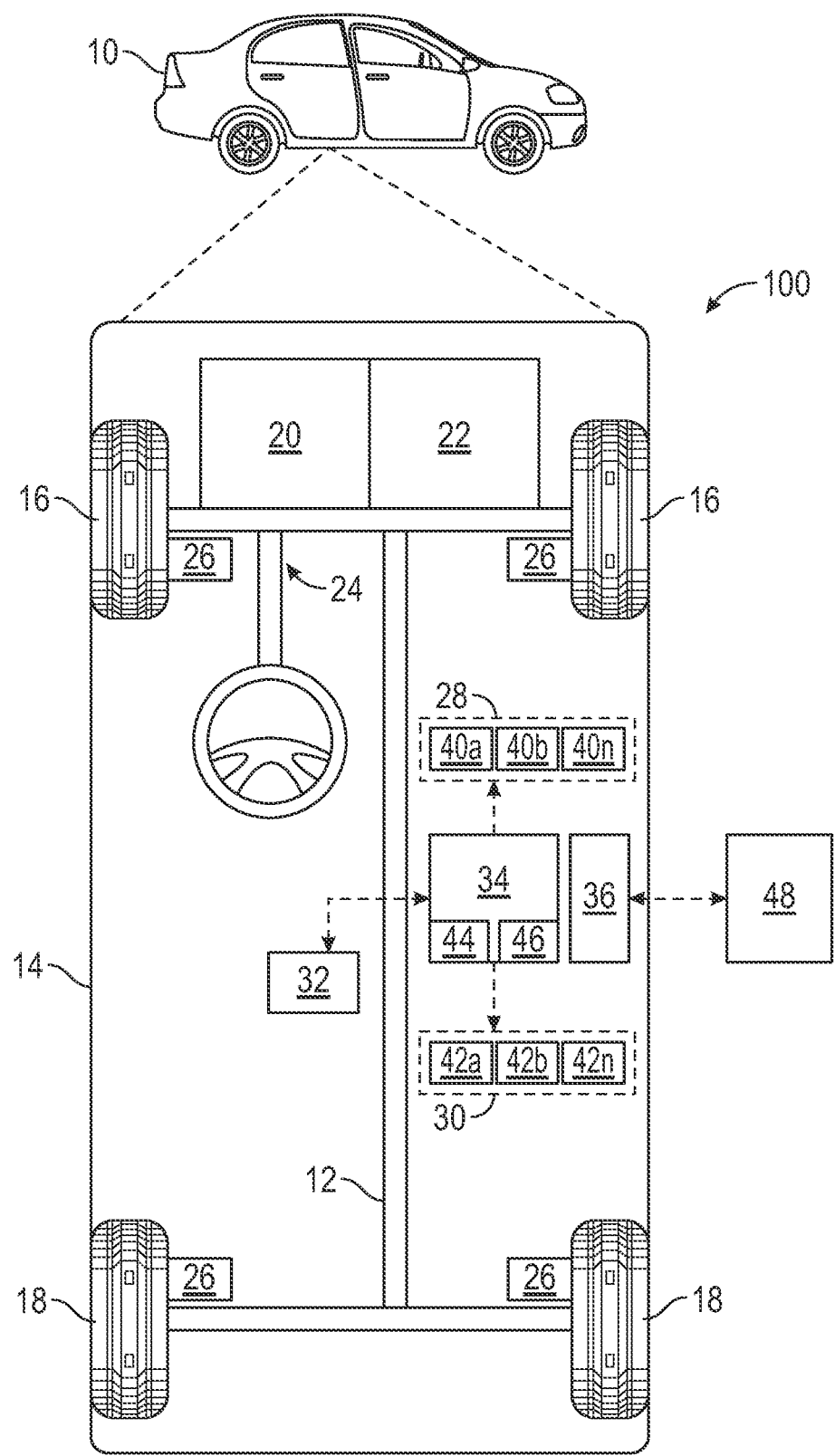
FIG. 1 illustrates a block diagram depicting an example vehicle that may include a processor for the lateral control of a steering system in accordance with an exemplary embodiment.

The following detailed description is merely exemplary in nature and is not intended to limit the application and uses. Furthermore, there is no intention to be bound by any expressed or implied theory presented in the preceding technical field, background, summary, or the following detailed description.

As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

Autonomous and semi-autonomous vehicles are capable of sensing their environment and navigating based on the sensed environment. Such vehicles sense their environment using multiple types of sensing devices such as optical cameras, radar, lidar, other image sensors, and the like. In such vehicles, the sensed data can be fused together with map data and vehicle sensors (Inertial Measurement unit, vehicle speed sensors, etc.) to identify and track vehicle trajectory tracking performance based on road geometry.

It is desirable to implement an ADAS system with online adaptation for handwheel control that compensates for steering uncertainties and provides steering controls for at least lateral features.

It is desirable to enable an adaptative control process that explicitly quantifies the uncertainties inherent in steering control systems, particularly in the steering feedforward gain by providing compensation by correction of one or more handwheel angle control parameters in steering control models.

It is desirable to provide steering and control architecture with adaptable handwheel angle control parameters that are applicable under low excitation conditions experienced in ADAS operations such as lane centering.

It is desirable to provide an adaptive steering process that enables seamless proliferation (widespread distributed use) of calibration individualized for each vehicle variant inherent in multicomponent vehicle assembly, and intelligent learning processes for other vehicle variant operations.

It is desirable to deploy an adaptive steering model for handwheel control that provides detection of vehicle hardware failures earlier in vehicular operations based on compensation data monitored in adaptive handwheel controls.

It is desirable to provide a robust control methodology for compensation for at least hardware temperature-based variants and to compensate for the impact caused by temperature-based variants in operating vehicles.

It is desirable to provide a method and system that acquires operating environmental factors that impact steering control systems for enhancing handwheel control. This adaptation may be implemented by use of associated steering modeling and modifying automated steering operational functions in response to the added conditions caused by the operating environment.

It is desirable for adaptive control structures, policy, and implementation for automated and assistive steering that contributes to desirable path following and lane-keeping features, and other active Safety and automated Driving features.

In embodiments, the present disclosure describes the intelligent algorithmic process that enables online adaptation for handwheel control that takes into account steering uncertainties and provides robust steering controls for ADAS lateral features. In embodiments, the present disclosure describes methodologies that explicitly quantify the uncertainties in the steering feedforward gain online and correct handwheel angle control parameters accordingly.

In embodiments, the present disclosure describes an adaptable online process that can be implemented in control of automated lateral steering operations in low excitation exhibited control conditions such as when applying lane centering control by configured vehicle variants.

In embodiments, the present disclosure describes the methodology that enables the seamless proliferation of calibration per vehicle variant and learning applicable for use in other variants.

In various exemplary embodiments, the present disclosure describes methods, systems, and apparatuses for a novel algorithm of online adaptation for handwheel control to account for steering uncertainties and provide robust steering controls for ADAS lateral features. The process described can explicitly quantify the uncertainties in the steering feedforward gain and correct handwheel angle control parameters accordingly. The process described includes a handwheel angle control parameter adaptable process that functions well under low excitation experienced during lane-centering features. The process includes an adaptive steering methodology that enables the seamless proliferation of calibration per vehicle variant and learning for implementations with other vehicle variants. The process enables early detection of hardware failure via monitoring associated with adaptive learning and enhanced robustness to environment impact (i.e., hardware temperature variants) and component variants exhibited in a vehicle variant.

FIG. 1 illustrates a block diagram depicting an example vehicle that may include a processor for the lateral control of a steering system in accordance with an exemplary embodiment.

In an exemplary embodiment, the steering system 100 ("system") provides adaptations for automated and assistive steering, and that identifies the impact and/or causes of suboptimal values in outcomes of control caused by uncertainties in component variants in ADAS lateral or other control features in various vehicle variants. The steering assistive control system provides the methodology for steering characteristic identification method that models the steering dynamics and provides the methodology for compensation of uncertainties in component variants in configurations of components associated with the vehicle variant.

In embodiments, the system provides use of a novel algorithm by the online adaptation for handwheel control to account for steering uncertainties and provide robust steering controls for ADAS lateral features that can allow explicit quantifying of the uncertainties in the steering feedforward gain and correcting handwheel angle control parameters accordingly. The system enables by use of the novel algorithms, adaptable processes of handwheel angle control parameters that function appropriately under low excitation control during such automated lateral control such as lane centering. The systems' learned knowledge may be propagated for use in other calibrations of vehicle variants, and earlier detection of hardware failure via monitoring associated with the adaptive learning, and environment impact exhibited in a vehicle variant.

As depicted in FIG. 1, vehicle 10 generally includes a chassis 12, a body 14, front wheels 16, and rear wheels 18. Body 14 substantially encloses components of vehicle 10. Body 14 and chassis 12 may jointly form a frame. The vehicle wheels 16-18 are each rotationally coupled to the chassis 12 near a respective corner of the body 14. Vehicle 10 is depicted in the illustrated embodiment as a passenger car. Still, it should be appreciated that any other vehicle, including motorcycles, trucks, sport utility vehicles (SUVs), recreational vehicles (RVs), marine vessels, aircraft, etc., can also be used.

As shown, vehicle 10 generally includes a propulsion system 20, a transmission system 22, a steering system 24, a brake system 26, a sensor system 28, an actuator system 30, at least one data storage device 32, at least one controller 34, and a communication system 36 to a remote server 48 for receiving software updates (e.g., adaptive model updates), and control data. The propulsion system 20 may, in this example, includes an electric machine such as a permanent magnet (PM) motor. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various exemplary embodiments, include friction brakes, brake by wire, a regenerative braking system such as an electric machine, and/or other appropriate braking systems.

The steering system 24 influences the position of the vehicle wheels 16 and/or 18. While depicted as including a steering wheel 25 for illustrative purposes, in some exemplary embodiments contemplated within the scope of the present disclosure, the steering system 24 may include a steer by wire (SBW) system of a steering wheel and control units for configuring steering parameters and coupled with sensors for detecting the handwheel angle.

The sensor system 28 includes one or more sensing devices 40a-40n that sense observable conditions of the exterior environment and/or the interior environment of the vehicle 10 (such as the handwheel angle) and generate sensor data relating thereto.

The actuator system 30 includes one or more actuator devices 42a-42n that control one or more vehicle features such as, but not limited to, the propulsion system 20, the transmission system 22, the steering system 24, and the brake system 26. In various exemplary embodiments, vehicle 10 may also include interior and/or exterior vehicle features not illustrated in FIG. 1, such as various doors, a trunk, and cabin features such as air, music, lighting, touchscreen display components, and the like.

The data storage device 32 stores data for use in controlling the vehicle 10. The data storage device 32 may be part of controller 34, separate from controller 34, or part of controller 34 and part of a separate system.

The controller 34 includes at least one processor 44 (integrate with system 100 or connected to the system 100) and a computer-readable storage device or media 46. The processor 44 may be any custom-made or commercially available processor, a central processing unit (CPU), a graphics processing unit (GPU), an application-specific integrated circuit (ASIC) (e.g., a custom ASIC implementing a neural network), a field-programmable gate array (FPGA), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals (e.g., sensor data) from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

For example, system 100 may include any number of additional sub-modules embedded within controller 34, which may be combined and/or further partitioned to similarly implement systems and methods described herein. Additionally, inputs to the system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2:
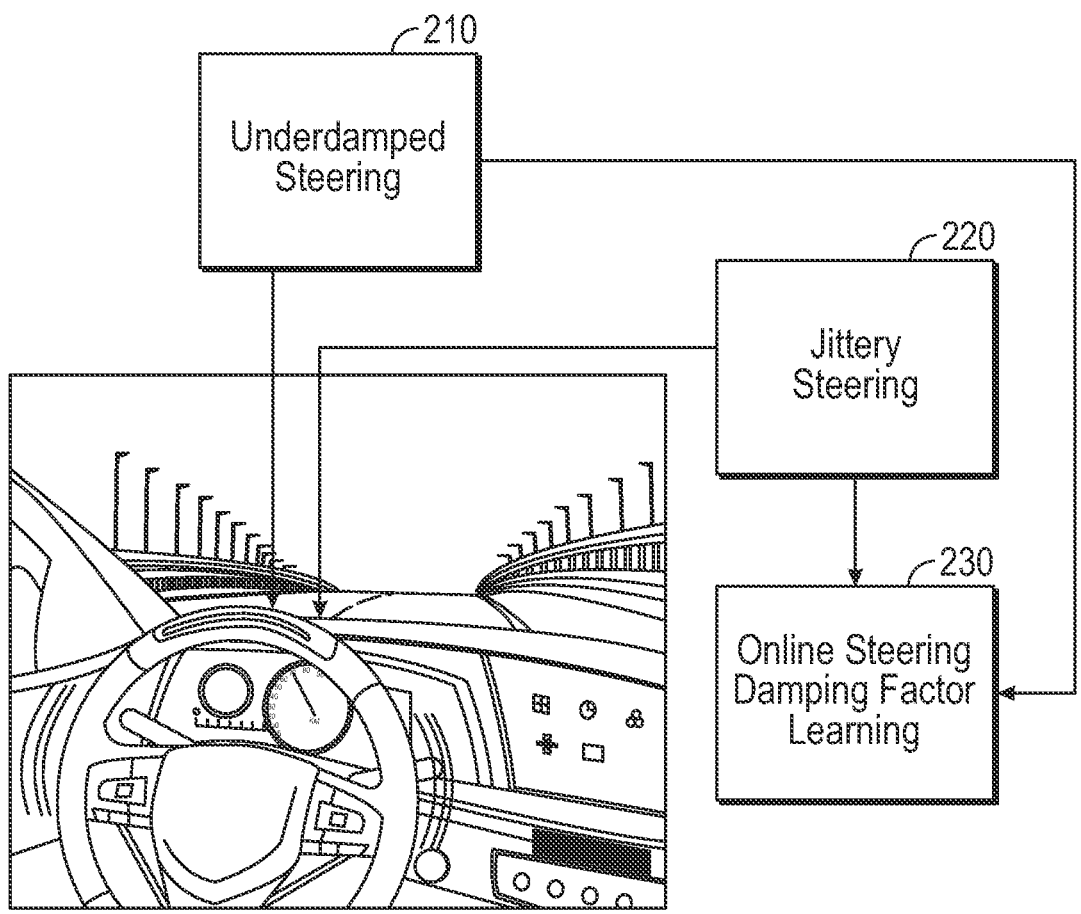
FIG. 2 illustrates an exemplary scenario of steering unstable conditions that cause suboptimal values in outcomes of control of lateral control features of advanced driver assist systems applied by the steering control system in accordance with an exemplary embodiment.

FIG. 2 illustrates an exemplary scenario of steering unstable conditions that cause suboptimal values in outcomes of control of lateral control features of advanced driver assist systems applied by the steering control system in accordance with an exemplary embodiment. In FIG. 2, a scenario is depicted of a pair of unstable steering conditions, and the online adaptation implemented that compensates by feed-forward control of the steering control system to prevent either unstable condition from occurring (i.e., solves the trade-off between underdamped and jittery steering states in steering control). The underdamped steering 210 is the result of sub-optimal steering damping, this steering condition is also referred to as "sluggish" steering. The other condition is a jittery steering wheel 220 that is the result of sub-optimal steering damping and is also referred to as "busyness" steering. For both conditions, the steering control system applies a learned control adaption for identifying and adapting a damping factor ($D_f$) online for feed-forward (FF) controls to prevent either condition. The desired trajectory is compared with a current tracking that is impacted by multiple types of dynamic forces (lateral and angular) to the front axle of the vehicle that causes the trajectory tracking error ($E_{trk}$). In embodiments, if the trajectory tracking error ($E_{trk}$) in an exemplary road curvature exceeds a threshold for an exemplary ADAS control such as a lane centering control (LCC), the result is that the LCC may disengage. In embodiments, the online learning of the damping factor may prevent or reduce the likelihood of the disengagement of the LCC.

In embodiments, the online steering damping factor learning control 230 provides a trade-off between the underdamped steering 210 condition and the jittery steering 220 conditions by using a measurement control model based on the coefficient $K_f$ which is modeled based on the measured steering angle, the previously learned steering damping value, and the requested torque to the EPS.

In embodiments, the online steering damping factor is determined by an iterative or systematic learning control process (described in an exemplary or different implementation in FIG. 5) based on reference criteria (ex. reference angle and reference values for HWA feedforward (FFD) values, HWA FFD offsets, and HWA adapt offset values) by implementing an open-loop dynamics between a control input and control output of an active steering control based on reference values of handwheel feedforward table values, handwheel feedforward offset table values, and handwheel feedforward adapted values for lateral path error correction and closed-loop dynamics of a handwheel feedback controller.

Figure 3:
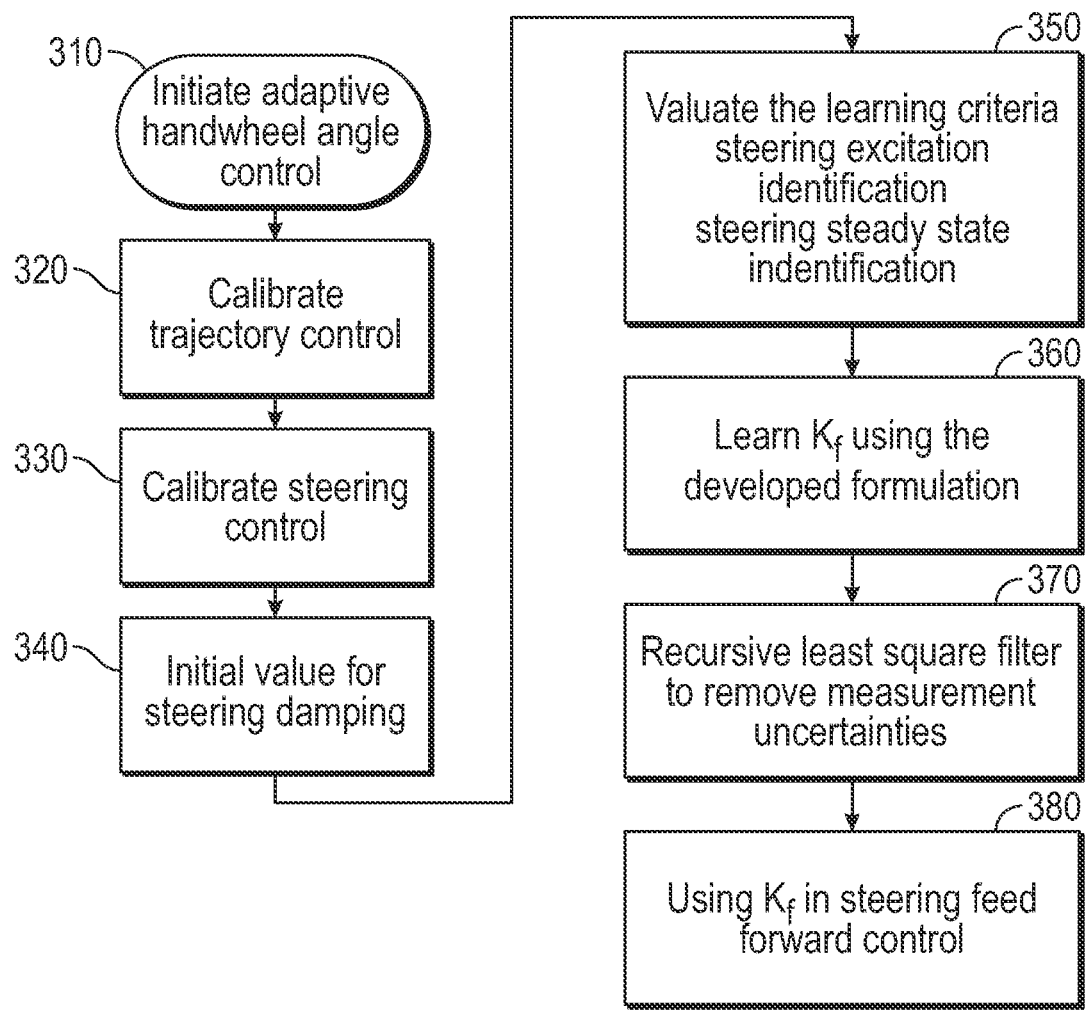
FIG. 3 illustrates an exemplary process flow for parameter identification for the steering system in accordance with an embodiment.

FIG. 3 illustrates an exemplary process flow for parameter identification for the steering system in accordance with an embodiment. In FIG. 3, at task 310, the system initiates an adaptive handwheel angle control process to generate a control signal based on an algorithm using an adaptive factor that models steering dynamics and corrects for the impact of variant uncertainties. In production, the vehicle is calibrated at task 320 for trajectory control and task 330 for steering control. The production calibration does not account for uncertainties or is limited in its ability to account for uncertainties, particularly in ADAS lateral features. At task 340, an initial value for steering damping $K_{f1}$ is identified and is equal to a value. At task 350, an evaluation criterion is evaluated by identifying the steering excitation and the steering steady state. The learning criteria goal is to determine a state of low excitation and a steady-state to develop a formulation to quantify the uncertainty in the steering feedforward gain and to correct the handwheel control parameters (via FFD offset values and adaptive offset values for the HWA).

At task 360, the coefficient $K_f$ is modeled based on the measured steering angle, the previously learned steering damping value, and the requested torque to the EPS. In embodiments, the algorithm is as follows: $k_{f_{k+1}} = k_{f_k} + g_k(\tau_k - k_{f_k}\theta_k)$ where the measured steering wheel angle $\theta_k$, previous learning step $k_{f_k}$, requested torque $\tau_k$, and $g_k$ from the recursive least square (RLS) algorithm is introduced into electric power steering (EPS) as $g(n) = P(n-1)x(n)\{\lambda + X^T(n) P(n-1)x(n)\}^{-1}$ and $p(n) = \lambda^{-1}P(n-1) - g(n)X^T(n)\lambda^{-1}P(n-1)$. Higher-order dynamics can also be considered in the measurement model to inertia, damping factor, friction, etc to generalize the approach.

In an exemplary embodiment, another measurement model (i.e., a more generalized format of a feed-forward model) for estimation is presented based on the wheel slip angle to better or differently describe the wheel's aligning torque $$k_{f_{k+1}} = k_{f_k} + g_k\left(\tau_k - \hat{D}_f\left(\delta - \frac{v_y + l_f\omega_z}{v_x}\right)\right).$$

That is, the more generalized format ("Df") of $$k_{f_{k+1}} = k_{f_k} + g_k\left(\tau_k - \hat{D}_f\left(\delta - \frac{v_y + l_f\omega_z}{v_x}\right)\right)$$

considers the sideslip angle and differentiates the coefficient $K_f$ while the other model of aligning torque or less generalized format ("Kf") of $k_{f_{k+1}} = k_{f_k} + g_k(\tau_k - k_{f_k}\theta_k)$ estimates the coefficient $K_f$. Either model results in the following feed-forward terms: In the first less generalized formulation of the feedforward torque based on the coefficient estimated to the desired handwheel angle with additions of the driver steering torque and other torque expressed by $\tau_{FF} = K_f\theta_{ref} + \tau_{drvr} + \tau_{frct}$ and the more generalized formulation of the feedback torque based on a differential of the coefficient and consideration of the slip angle with additions of the driver steering torque and other torque expressed by $$\tau_{FF} = \hat{D}_f\left(\delta - \frac{v_y + l_f\omega_z}{v_x}\right) + \tau_{drvr} + \tau_{frct}.$$

The recursive least square filter (or process) removes measurement uncertainties at task 370. At task 380, the adapted steering coefficient $K_f$ is applied to the steering feed-forward control (i.e., a feedback torque $\tau_{FB} = -K_1 e - K_2\dot{e}$, and $\tau_{FF} = K_f\theta_{ref}$).

Figure 4:
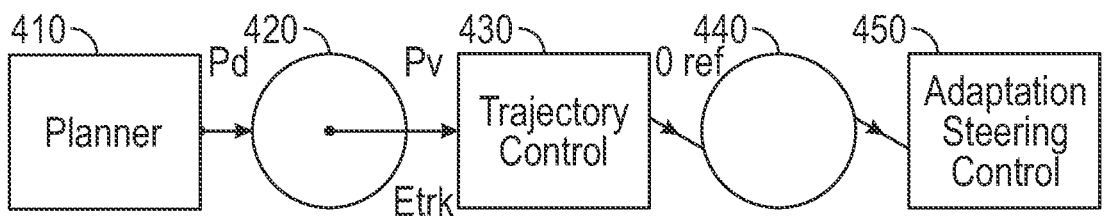
FIG. 4 illustrates a diagram of the control architecture for tracking a steering angle trajectory and applying adaptation steering control torques to correct the steering angle by the steering control system in accordance with an exemplary embodiment.

In embodiments, the various parameters referenced include the following:
- $k_{f_k}$: Steering coefficient for handwheel angle
- $\tau_k$: requested torque to EPS
- $\theta_k$: measured handwheel angle
- $\theta_{ref}$: desired handwheel angle
- $\delta_{ref}$: desired road wheel angle
- $\delta$: vehicle road wheel angle
- $\hat{D}_f$: Steering coefficient for slip angle
- $v_y$: vehicle lateral velocity
- $v_x$: vehicle longitudinal velocity
- $\omega_z$: vehicle yaw rate
- $l_f$: distance from front axle to CG of the vehicle
- $\tau_{drvr}$: Driver's applied torque to the steering wheel
- $\tau_{frct}$: required torque to compensate for steering system friction
- e: Steering control tracking error, an error between the desired handwheel angle and measured handwheel angle
- $E_{trk}$: a trajectory tracking error
- $P_d$: desired trajectory $K_{us}$: Vehicle understeer coefficient
$k_s$: steering ratio
$\rho_{ref}$: reference curvature for lane following control
$a_y$: vehicle lateral acceleration FIG. 4 illustrates a diagram of the control architecture for tracking a steering angle trajectory and applying adaptation steering control torques to correct the steering angle by the steering control system in accordance with an exemplary embodiment. In FIG. 4, a planner (i.e., high-level planner) produces the desired trajectory ($P_d$) in accordance with the current vehicle velocity ($P_v$) that generates a trajectory tracking error ($E_{trk}$) 420 to a trajectory control 430 that produces a steering reference trajectory that is necessary to achieve the desired trajectory ($P_d$) from the planner 410. The trajectory control 430 determines the desired handwheel angle $\theta_{ref}$ for the steering reference trajectory that is compared at a comparator 440 with the measured wheel angle $\theta$ to achieve the planner trajectory.

The adaptation steering control 450 tracks the reference road wheel angle ($\delta_{ref}$, $\dot\delta_{ref}$ or reference handwheel angle $\theta_{ref}$, $\dot\theta_{ref}$ as described above by commanding the steering torque $\tau_{cmd}$ and applying a feedforward steering torque $\tau_{ff}$ on gain and feedback control to reduce the tracking error. The adaptive online learning uses tabular values to predict the steering angle and the steering rate based on the applied steering torque.

In embodiments, the trajectory control 430 using the algorithm $\delta_{FB} = -KE_{trk}$ and $\delta_{FF} \rho_{ref}(L+K_{us}V_x^2)$ models input for the control signal to the adaptation steering control 450 based on trajectory tracking error, road curvature, and steering control. The trajectory control 430 generates an output $\theta_{ref} = k_s \delta_{ref}$ to the adaptation steering control 450.

In embodiments, the adaptation steering control 450 includes a feedback control 460 for generating a feed-back control signal of torque (in a feed-back direction) to the EPS and the feedforward control for generating the feed-forward control signal of torque (in a feed-back direction) to the EPS. The feedback control of the steering feedback control may or can similarly apply a feedback torque $\tau_{FB} = -K_1 e - K_2 \dot e$ and feedforward control of the feed-forward torque $$\tau_{FF} = K_f \theta_{ref} + \tau_{drvr} + \tau_{frct} \left( \text{or } \tau_{FF} = \hat D_f \left( \dot\delta - \frac{v_y + l_f \omega_z}{v_x} \right) + \tau_{drvr} + \tau_{frct} \right)$$

if slip angle was used in the measurement model). The additional input torque (for example manual input by the driver) is added to the algorithm by the driver steering $\tau_{Drvr}$ and the other torque $\tau_{frct}$ is also for the total torque force applied to the vehicle.

In embodiments, when the slip angle is considered the feedforward control receives an input from the adapt electronic power steering (EPS) damping factor $\hat D_f$. The adapt EPS damping factor $\hat D_f$ is modeled by the equation $$\frac{\dot\tau_{EPS}}{2} + \frac{\dot V_x}{V_x}\tau_{EPS} = D_f\left(\dot\delta + \omega_z - \frac{a_y + l_f \dot\omega_z - \dot V_x \delta}{V_x}\right).$$

The EPS receives the torque command $\tau_{cmd}$ generated by the steering control designed to stabilize $e \to 0$ based on the $e = \theta_{ref} - \theta$.

Figure 5:
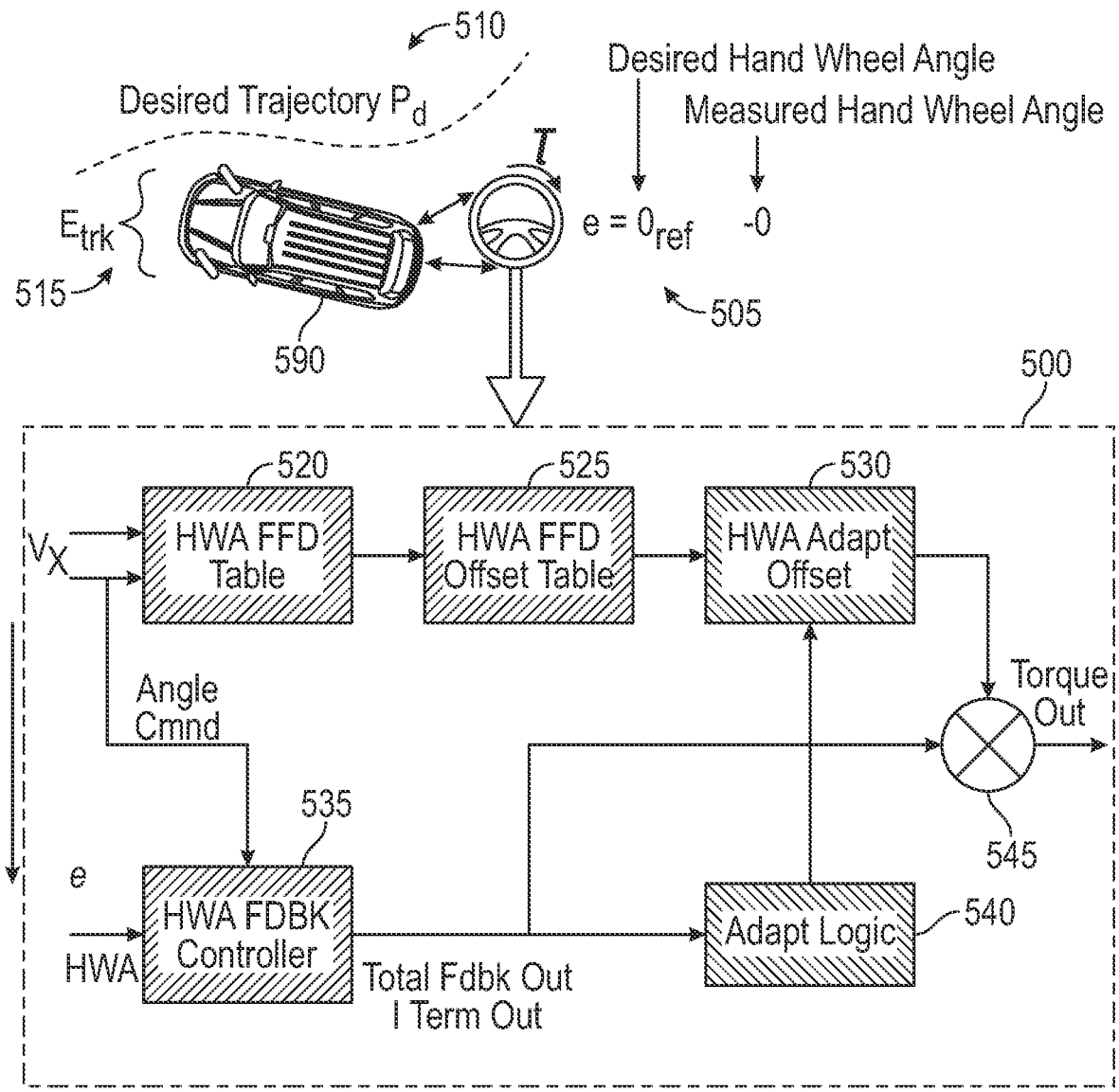
FIG. 5 illustrates a diagram of another exemplary implementation of a model for configuring the desired handwheel angle (HWA) to trajectory track error to compensate for underdamped or jittery steering using a set of tables Handwheel Angles of the steering control system in accordance with an embodiment.

FIG. 5 illustrates a diagram of a different implement of configuring the desired handwheel angle (HWA) to trajectory track error using a set of tables Handwheel Angles of the steering control system in accordance with an embodiment.

The feedforward control unit 500 includes a feedback control for generating a feed-back control signal of torque (in a feed-back direction) to the EPS and the feedforward for generating the feed-forward control signal of torque (in a feed-back direction) to the EPS.

In FIG. 5, the one or more driver inputs further include a handwheel angle (HWA) and a vehicle speed. In one embodiment, a set of lookup tables for generating each of the desired vehicle handling aspects, wherein each lookup table within the set of lookup tables is individually tuned to correspond to the specific steering mode selected.

In embodiments, the feedforward control unit 500 includes a steering feedback control of the feedback torque output $\tau_{FB} = -K_1 e - K_2 \dot e$ and the feedforward control unit 500 applies the feed-forward torque $$\tau_{FF} = \hat D_f\left(\dot\delta - \frac{v_y + l_f \omega_z}{v_x}\right) + \tau_{drvr} + \tau_{frct}.$$

The additional input torque (for example manual input by the driver) is added to the algorithm by the driver steering $\tau_{Drvr}$ and the other torque $\tau_{frct}$ is also for the total torque force applied to the vehicle.

In embodiments, the feedforward control unit 500 receives an input from the adapt electronic power steering (EPS) damping factor $\hat D_f$. The adapt EPS damping factor $\hat D_f$ is modeled by the equation $$\frac{\dot\tau_{EPS}}{2} + \frac{\dot V_x}{V_x}\tau_{EPS} = D_f\left(\dot\delta + \omega_z - \frac{a_y + l_f \dot\omega_z - \dot V_x \delta}{V_x}\right).$$

In reference to FIG. 5, FIG. 5 shows a desired trajectory 510 and the steering control tracking (e) that is responsive to the road curvature and the trajectory control signal $E_{trk}$ via a trajectory control. A feedback of the $\tau_{cmd}$ is sent to the EPS and adjusted by a correction angle e to compensate for the trajectory tracking error ($E_{trk}$) 515. The correction angle e is shown as the following angular difference 505: $e = \theta_{ref} - \theta$ of the desired vehicle 590 handwheel angle is $\theta_{ref}$ to the measured handwheel angle $\theta$ of the vehicle 590. An amount of torque $\tau$ must be computed based on this angular difference to correct the handwheel angle (i.e., the torque $\tau$ generated by a torque command $\tau_{cmd}$ based on the total feedback out and the output from the HWA adapt offset 530 to make the angular correction angle $e = \theta_{ref} - \theta$ based on the vehicle speed $v_x$. The amount of correction required to the handwheel angle by a feedforward control operation of receiving vehicle speed $v_x$, to determine the value from an HWA feedforward (FFD) value table 520 (as an example, the values may be determined by various dynamic measurements that include $\tau_{EPS}$, $\delta$, adapted steering coefficient $K_f$, vehicle speed $v_x$, and angular motion $\omega_z$, vehicle acceleration ($a_y$, $a_x$)).

This value is used to determine via an HWA FFD offset table 525, offset value. This value in turn is what the HWA adapt offset 530 value is based on. The HWA Feedback controller 535 is responsive to an angle command and input of the correction angle amount determines the total feedback out that is sent as an input to the adapt logic 540 used by the HWA adapt offset 530. The feed-forward torque 545 is configured by a multiplier that combines outputs from the HWA adapt offset 530 and input of the total FB (HWA feedback (FB) controller 535) out to generate an output of the torque $\tau_{EPS}$ to correct the handwheel angle and this puts the vehicle 590 on the desired trajectory 510.

In embodiments, a neural network model may be implemented for storing and determining the HWA FFD value, the HWA offset value, and the adapt offset value.

Figure 6:
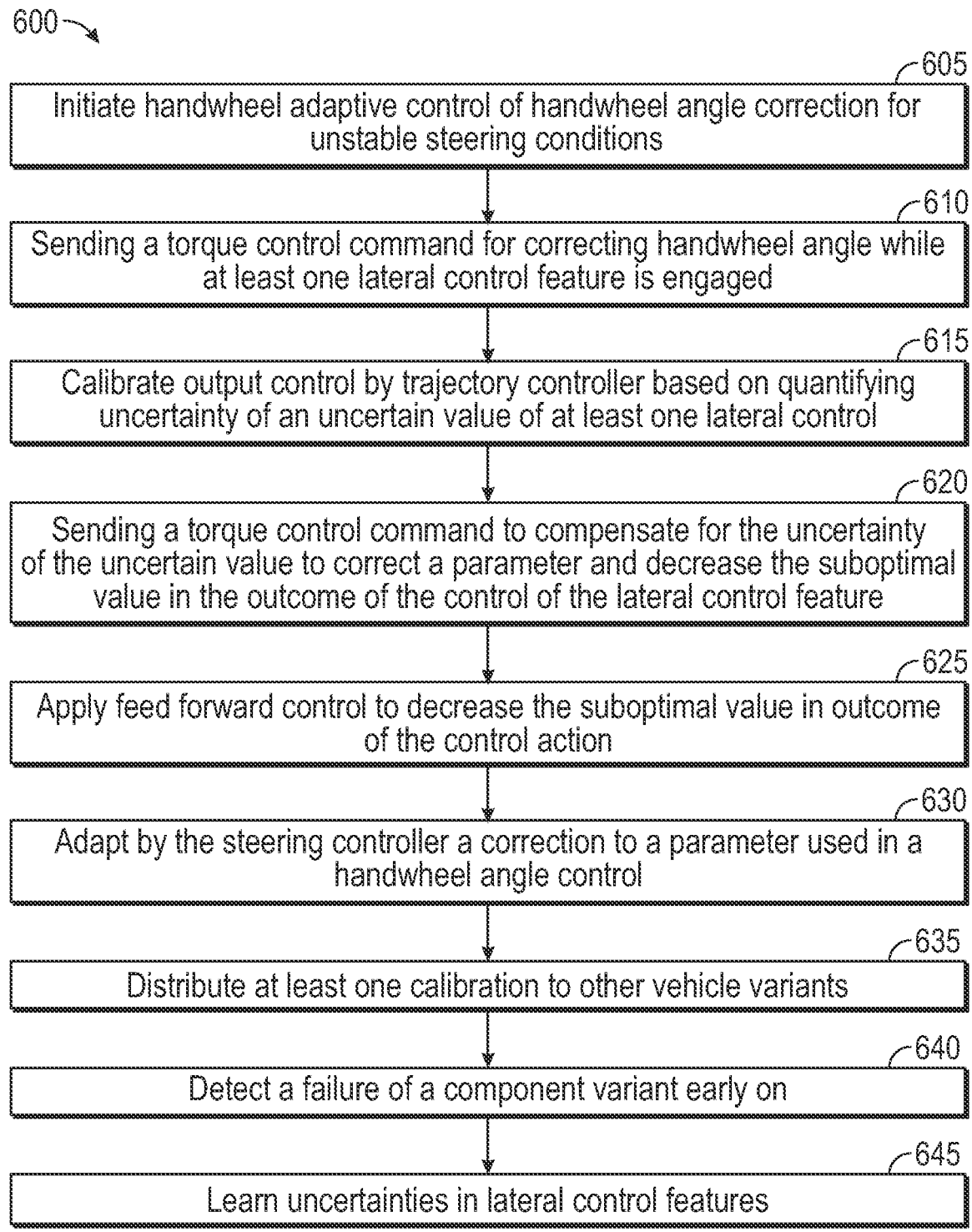
FIG. 6 illustrates an exemplary flowchart of the process of lateral control by the steering system in accordance with an embodiment.

FIG. 6 illustrates an exemplary flowchart of the process of lateral control by the steering system in accordance with an embodiment. Flowchart 600 includes the task to enable the adaptive control of the steering system ("system"). At task 605, torque control is initiated by the system to send a torque control command to an EPS for controlling a feed-forward or feed back-torque assist to the steering system and is based on input control signals from a vehicle trajectory control unit when the vehicle is operating and engaging at least one lateral control feature of an ADAS.

At task 610, the system configures the steering system by identifying by the steering controller disposed of in the vehicle one or more parameters used in a lateral control automated driver assist feature implemented by the ADAS that causes an results in optimized value for an outcome of control in the lateral control feature enabling robustness to uncertainty.

At task 615, the system calibrates by the steering controller, an output control signal produced by a vehicle trajectory controller connected to the steering controller, by quantifying the uncertainty of an uncertain value of one or more lateral control features. The uncertainty of the uncertain value in the lateral control feature is caused by a component variant in production assembly that results in a produced vehicle which is a variant type vehicle or a vehicle variant.

At task 620, the system sends by the steering controller, a torque control command to compensate for the uncertainty of an uncertain value in a set of components of the electronic power steering (EPS) system associated with the vehicle variant to correct one or more parameters in a lateral control feature. The correction that occurs to one or more parameters causes a suboptimal value in the outcome of the control for the lateral control feature.

At task 625, the system applies by the steering controller, a feed-forward control action to optimize a value in the outcome of the control action of the lateral control feature in use by the EPS system. The torque control command that is applied may include a torque-assist to the steering system to compensate for the uncertainty of the uncertain value in the lateral control feature.

At task 630, the system adapts by the steering controller, a correction to a parameter used in a wheel angle control of the steering system that is associated with a function of low excitation caused during application of a lateral control feature. In implementations, the lateral control feature is directed to control features of the steering control implemented with the steering system. In implementations, the lateral control feature includes a lane-centering lateral control feature of the steering control implemented with the steering system.

At task 635, the system distributes at least one calibration associated with a component or vehicle variant that may be used in one or several automated features in driver-assist steering or other operation driving functions and incorporated in the vehicle variant.

At task 640, the system may be configured to detect a failure of a component variant that is associated with a lateral control feature.

At task 645, the system may be configured to learn by the steering controller, an uncertainty or various uncertainties of one or more uncertain values in the lateral control feature of the vehicle variant in an operating environment of the vehicle variant that contains a condition that impacts the steering control. In an embodiment, the condition can cause an uncertain value in the lateral control feature in the vehicle variant.

It should be appreciated that process of FIGS. 1-6 may include any number of additional or alternative tasks, the tasks shown in FIGS. 1-6 need not be performed in the illustrated order and process of the FIGS. 1-6 may be incorporated into a more comprehensive procedure or process having additional functionality not described in detail herein. Moreover, one or more of the tasks are shown in FIGS. 1-6 could be omitted from an embodiment of the process shown in FIGS. 1-6 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof.

What is claimed is:

1. A method for lateral control of a steering system, comprising:
  identifying, by a steering controller disposed of in a vehicle, at least one parameter of at least one lateral control feature of an Advanced Driver Assist System (ADAS) that causes at least a result in an optimized value in an outcome of control for at least one lateral control feature enabling robustness to uncertainty of at least one uncertain value used in the outcome of control;
  adaptively adjusting, by the steering controller, an output control signal generated by a vehicle trajectory controller coupled to the steering controller, by quantifying the uncertainty of at least one uncertain value in the at least one lateral control feature wherein uncertainty of the at least one uncertain value in the at least one lateral control feature is caused from at least one component variant in a configuration of components associated with a vehicle variant; and
  sending, by the steering controller, a control command comprising at least a torque control or a wheel angle control to compensate for the uncertainty of the at least one uncertain value in the configuration of components of an electronic power steering (EPS) system associated with the vehicle variant by correcting at least one parameter of the at least one lateral control feature wherein the correcting of the at least one parameter causes a suboptimal value in the outcome of control for the at least one lateral control feature.

2. The method of claim 1, further comprising:
applying, by the steering controller, a feed-forward control action to at least enhance robustness in response to the uncertainty in outcome of the control of at least one lateral control feature applied by the EPS system wherein the uncertainty comprises model and environmental uncertainties.

3. The method of claim 2, wherein the torque control command comprises at least a torque-assist or the wheel angle control to the steering system to compensate for the uncertainty of the at least one uncertain value in the at least one lateral control feature.

4. The method of claim 3, further comprising:
adapting, by the steering controller, a correction to the at least one parameter used in at least the wheel angle control of the steering system that is associated with at least a function of a low excitation state in lateral movement of the vehicle that is caused during application of the at least one lateral control feature.

5. The method of claim 4, wherein the at least one lateral control feature is directed to control features of the steering control implemented with the steering system.

6. The method of claim 5, further comprising:
wherein the at least one lateral control feature comprises a lane-centering lateral control feature of the steering control implemented with the steering system.

7. The method of claim 6, further comprising:
distributing at least one calibration associated with the at least one component variant for use with at least one or more features that are incorporated in the vehicle variant.

8. The method of claim 7, further comprising:
detecting a failure in at least the least one component variant associated with the at least one lateral control feature of the vehicle variant.

9. The method of claim 8, further comprising:
learning, by the steering controller, the uncertainty of the at least one uncertain parameter or an uncertain state in the at least one lateral control feature in a configuration associated with the vehicle variant in an operating environment of the vehicle variant that contains a condition that impacts the steering control wherein the condition causes the at least one uncertain parameter or the uncertain state in the at least one lateral control feature in the vehicle variant wherein the vehicle variant comprises a temperature change in the operating environment.

10. A system comprising:
a processing unit disposed of in a vehicle comprising one or more processors configured by programming instructions encoded on non-transient computer-readable media for control of at least an electronic power steering (EPS) that includes a steering controller configured to:
send a control command comprising at least a torque control or an angle control, to the EPS that is based on input control signals from a vehicle trajectory control system that causes a corrective action by a feed-forward control of a steering system;
identify at least one parameter of at least one lateral control feature of an Advanced Driver Assist System (ADAS) that results in an optimized value to an outcome of control for at least one lateral control feature that results in a robust response to uncertainty of at least one uncertain value used in the control;
calibrate an output control signal generated by a vehicle trajectory controller coupled to the steering controller, by quantifying the uncertainty of at least one uncertain value in the at least one lateral control feature wherein uncertainty of the at least one uncertain value in the at least one lateral control feature is caused from at least one component variant in a configuration of components associated with a vehicle variant; and
send the control command to compensate for the uncertainty of the at least one uncertain value in the configuration of components associated with the vehicle variant by adjusting at least one parameter of the at least one lateral control feature wherein the adjusting of the at least one parameter causes a suboptimal value of outcome of the control for the at least one lateral control feature.

11. The system of claim 10, further comprising:
the processing unit configured to:
apply the feed-forward control to the steering system to at least enhance robustness in response to the uncertainty, wherein the uncertainty comprises at least a model uncertainty and environmental uncertainty, in the outcome of the control of the at least one lateral control feature applied by the EPS.

12. The system of claim 11, wherein the torque control command comprises at least a torque-assist, or the angle control, to the steering system to compensate for the uncertainty of the at least one uncertain value in the at least one lateral control feature.

13. The system of claim 12, further comprising:
the processing unit configured to:
adapt the adjusting to the at least one parameter for at least a handwheel angle control, or another input to the model comprising at least a road wheel angle, of the steering system that is associated with at least a function of a low excitation state in lateral movement of the vehicle caused during use of the at least one lateral control feature.

14. The system of claim 13, wherein the at least one lateral control feature is directed to steering control implemented with the steering system.

15. The system of claim 14, wherein the at least one lateral control feature comprises a lane-centering lateral control feature of the steering control implemented with the steering system.

16. The system of claim 15, further comprising:
the processing unit configured to:
distribute the at least one calibration associated with the at least one component variant for use with at least one or more lateral control features that are incorporated in the vehicle variant.

17. The system of claim 16, further comprising:
the processing unit configured to:
detect a failure in the least one component variant associated with the at least one lateral control feature of the vehicle variant.

18. A vehicle apparatus, comprising an electronic power steering (EPS) unit comprising one or more processors and non-transient computer-readable media encoded with programming instructions, for control of the EPS unit is configured to:
send a torque control that is based on input control signals from a vehicle trajectory control system that causes a corrective action by a feed-forward control of a steering controller of a steering system;

identify at least one parameter of at least one lateral control feature that causes at least a result in an optimized value in an outcome of a control for at least one lateral control feature and enables a robust response to an uncertainty of at least one uncertain value in the control;

calibrate an output control signal generated by a vehicle trajectory controller coupled to the steering controller, by quantifying the uncertainty of at least one uncertain value in the at least one lateral control feature wherein uncertainty of the at least one uncertain value in the at least one lateral control feature is caused from at least one component variant in a configuration of components associated with a vehicle variant; and send a torque control command to compensate for the uncertainty of the at least one uncertain value in the configuration of components associated with the vehicle variant by adjusting at least one parameter of the at least one lateral control feature wherein the adjusting of the at least one parameter causes a suboptimal value of the outcome of the control for the at least one lateral control feature.

19. The vehicle apparatus of claim 18, further comprising:
the steering controller configured to:
apply a feed-forward control action for adjusting the suboptimal value in the outcome of the control of at least one control feature applied by the EPS unit.

20. The vehicle apparatus of claim 19, further comprising:
the steering controller configured to:
adapt the adjusting to the at least one parameter for a wheel angle control of the steering system that is associated with at least a function of low excitation caused during use of the at least one lateral control feature.

* * * * *